(12) United States Patent
De Ieso

(10) Patent No.: US 9,311,794 B2
(45) Date of Patent: Apr. 12, 2016

(54) SYSTEM AND METHOD FOR INFRARED INTRUDER DETECTION

(76) Inventor: Pietro De Ieso, Pascoe Vale South (AU)

( * ) Notice: Subject to any disclaimer, the term of this patent is extended or adjusted under 35 U.S.C. 154(b) by 629 days.

(21) Appl. No.: 13/447,466

(22) Filed: Apr. 16, 2012

(65) Prior Publication Data

US 2012/0307066 A1  Dec. 6, 2012

Related U.S. Application Data

(60) Provisional application No. 61/491,238, filed on May 30, 2011.

(51) Int. Cl.
*H04N 7/18* (2006.01)
*G08B 13/196* (2006.01)
*H04N 5/33* (2006.01)

(52) U.S. Cl.
CPC ...... *G08B 13/19602* (2013.01); *G08B 13/1961* (2013.01); *H04N 5/33* (2013.01); *H04N 7/183* (2013.01)

(58) Field of Classification Search
CPC .............. G08B 13/19669; G08B 13/19602; G08B 13/19641; G08B 13/19689; G08B 13/19606

See application file for complete search history.

(56) References Cited

U.S. PATENT DOCUMENTS

| | | | |
|---|---|---|---|
| 6,476,858 B1 * | 11/2002 | Ramirez Diaz et al. | 348/159 |
| 2004/0183679 A1 * | 9/2004 | Paximadis et al. | 340/567 |
| 2005/0128291 A1 * | 6/2005 | Murakami | 348/143 |
| 2008/0258914 A1 * | 10/2008 | Kondo et al. | 340/552 |
| 2011/0032109 A1 * | 2/2011 | Fox | 340/628 |
| 2011/0054721 A1 * | 3/2011 | Goodrich et al. | 701/14 |
| 2013/0208811 A1 * | 8/2013 | Liu et al. | 375/240.26 |

* cited by examiner

*Primary Examiner* — Huy T Nguyen
(74) *Attorney, Agent, or Firm* — Joseph Stecewycz

(57) ABSTRACT

Disclosed is an intruder alarm system comprising: an infrared camera set up to monitor a predetermined area of interest; a video analysis module in communication with the infrared camera, the video analysis module for providing video analysis of at least one of a plurality of video frames received from the infrared camera; and an alarm signal module for generating an alarm signal in response to intruder activity indicated by the video analysis module.

20 Claims, 3 Drawing Sheets

SYSTEM AND METHOD FOR INFRARED INTRUDER DETECTION

CROSS REFERENCE TO RELATED APPLICATION

The present Application is related to Provisional Patent Application entitled "Infrared Intruder Detector," filed 30 May 2011 and assigned filing No. 61/491,238, incorporated herein by reference in its entirety.

FIELD OF THE INVENTION

This invention relates to electronic security systems and, in particular, to an intruder alarm system operating using infrared radiation for detection.

BACKGROUND OF THE INVENTION

Conventional intruder systems operate by means of sensors deployed outside or within a building. These technologies include passive infrared (PIR) sensors, microwave sensors, ultrasonic sensors, magnetic reed switch sensors, vibration sensors, and seismic sensors. A passive infrared detector, for example, may include pixel pairs wired as opposite inputs to a differential amplifier. Detection of an IR source causes closing of a relay switch, and issuing an alarm signal.

In a typical application, the particular sensor is used to detect and activate a corresponding relay that is wired into an alarm panel. The alarm panel transmits the alarm event, typically over the public switched telephone network (PSTN), to a central monitoring station. The difficulties these sensors can have are the ability to cope well with variable environmental conditions within the monitored area, and the ability to distinguish between a valid alarm and a false alarm.

BRIEF SUMMARY OF THE INVENTION

In one aspect of the present invention, an intruder alarm system comprises: an infrared camera set up to monitor a predetermined area of interest; a video analysis module in communication with the infrared camera, the video analysis module for providing video analysis of at least one of a plurality of video frames received from the infrared camera; and an alarm signal module for generating an alarm signal in response to intruder activity indicated by the video analysis module.

In another aspect of the present invention, a method for infrared monitoring of a predetermined area of interest comprising: setting up an infrared camera having a field of view including the predetermined area of interest; transmitting a plurality of video frames from the infrared camera to a video analysis module; analyzing video images in the plurality of video frames with the video analysis module; if the video analysis module provides an indication of the presence of an intruder, generating an alarm signal in response to the indication.

The additional features and advantage of the disclosed invention is set forth in the detailed description which follows, and will be apparent to those skilled in the art from the description or recognized by practicing the invention as described, together with the claims and appended drawings.

BRIEF DESCRIPTIONS OF THE DRAWINGS

The foregoing aspects, uses, and advantages of the present invention will be more fully appreciated as the same becomes better understood from the following detailed description of the present invention when viewed in conjunction with the accompanying drawings, in which.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims. Those skilled in the art will appreciate that the conception upon which the disclosure below is based may readily be utilized as a basis for designing other products. For example, video compression and digital signal standards as disclosed and claimed are not limited to the methods and standards described herein, and the compression formats, and the electrical characteristics of the drivers and receivers can be modified without departing from the spirit of the invention.

Figure 1:
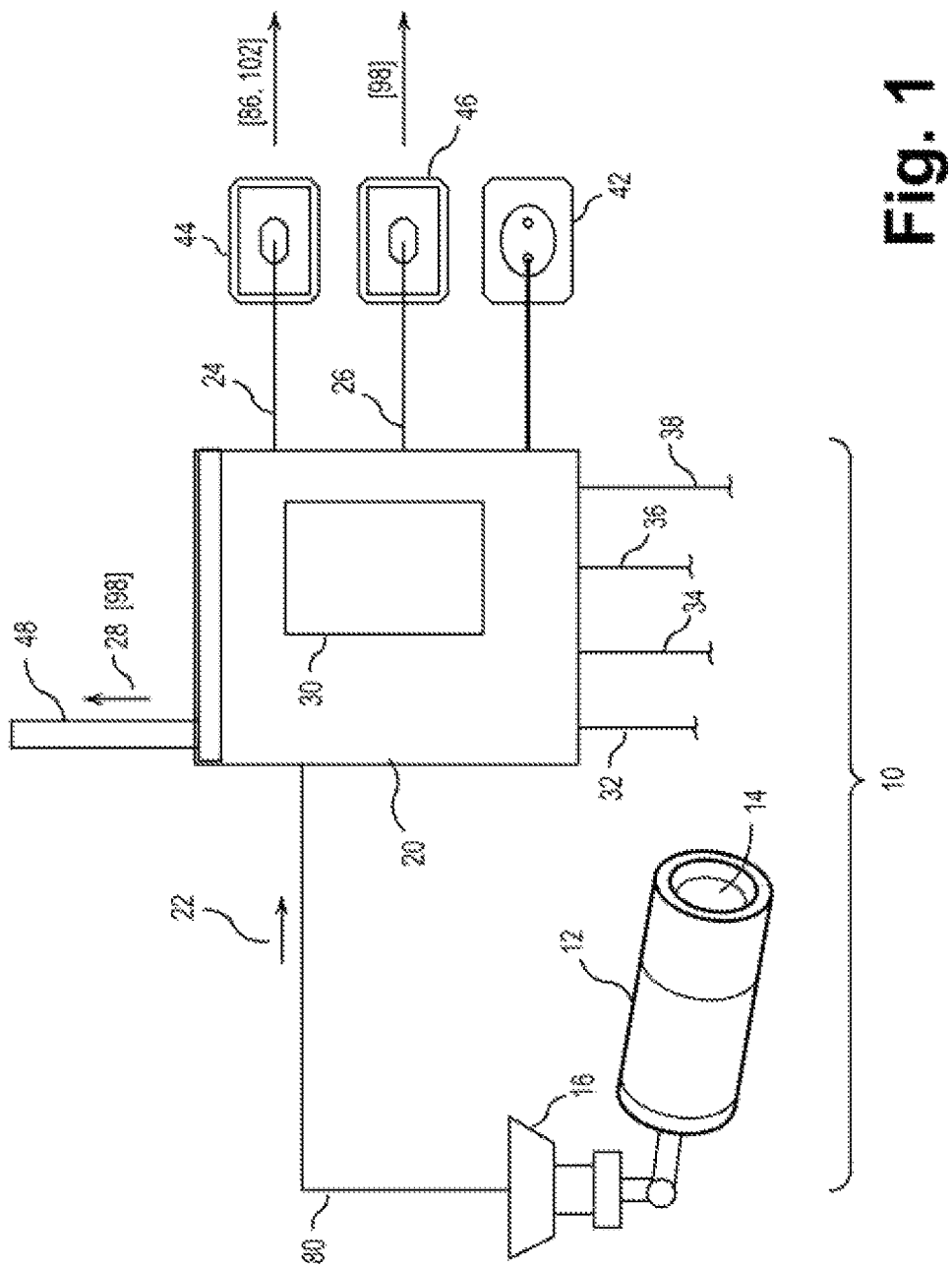
FIG. 1 is a block diagram illustrating an intruder alarm system showing a digital camera in communication with an alarm capture module disposed in an alarm capture interface, in accordance with the present invention.

There is shown in FIG. 1 an embodiment of an intruder alarm system 10, in accordance with the present invention. The intruder alarm system 10 includes at least one infrared (IR) camera 12 in electronic communication with an alarm capture interface 20, described in greater detail below. The IR camera 12 is set up, that is, located and positioned, so as to continually acquire sequential still or video digital images of a secured area that is being monitored for possible intrusion by unauthorized persons. The alarm capture interface 20 remains in continuous communication with the IR camera 12, and responds to changes in the monitored area of interest, as described in greater detail below.

The IR camera 12 preferably comprises a still or video camera, cooled or non-cooled, which may be disposed within a protective, unitary camera housing as part of the intruder alarm system 10. The IR camera 12 functions to detect thermal radiation that includes thermal emissions indicative of human body temperature or of newly-appearing thermal patterns entering the camera field of view. In an exemplary embodiment, the IR camera 12 may be controllable by remotely-generated signals transmitted over a communication network, such as, for example, via an IP network, via an analog network, or via the Internet. A commercially-available IR camera suitable for use in the disclosed intruder alarm system 10 may be, for example, an F-series high-resolution thermal security camera manufactured by FLIR Systems of Portland, Oreg., USA. The IR camera 12 may include an optical lens 14 having either a predetermined fixed focal length or may include a zoom lens (not shown) with a variable focal length, as may be used with camera panning to bring a selected detection area into the field of view of the IR camera 12.

An optional camera bracket 16 may be provided for attaching the IR camera 12 to a stable surface, such as a wall or a ceiling, from which the IR camera 12 may be oriented so as to provide optimal monitoring of the detection area. An IP/power cable assembly 18 may be provided to interconnect the IR camera 12 with the alarm capture interface 20 to thereby facilitate two-way signal communication between the IR camera 12 and the alarm capture interface 20.

A camera data stream 22 of video and intruder alarm information may be provided by the IR camera 12 to an alarm capture module 30 in the alarm capture interface 20. The alarm capture interface 20 may subsequently provide to a remote security control room 50 (shown in FIG. 3) monitoring information obtained by processing the camera data stream 22 as per the alarm capture module 30. The alarm capture interface 20 may provide the monitoring information as one or more of: (i) dual-tone multi-frequency (DTMF) tones 24 to the public switched telephone network (PSTN) via a telephone connection socket 44, (ii) an IP data output signal 26 to the PSTN or to a LAN, VPN, or WAN via an IP data connection socket 46, and (iii) a wireless signal 28, in conformance with IEEE Standard 802.11g, for example, via a cellular network antenna 48.

The alarm capture interface 20 may further receive AC electrical power from a standard power outlet 42, and may include an optional battery backup at a DC port 38, typically 10-32 VDC, to maintain operating power to the intruder alarm system 10 in case of power failure. The alarm capture interface 20 may also include: (i) an additional input/output port 32, such as for providing a TTL alarm input for arming and output for relay triggering, (ii) an environmental control port 34 that functions to provide information related to ambient environmental conditions, and (iii) an auxiliary serial port 36 for pan/tilt camera control.

Figure 2:
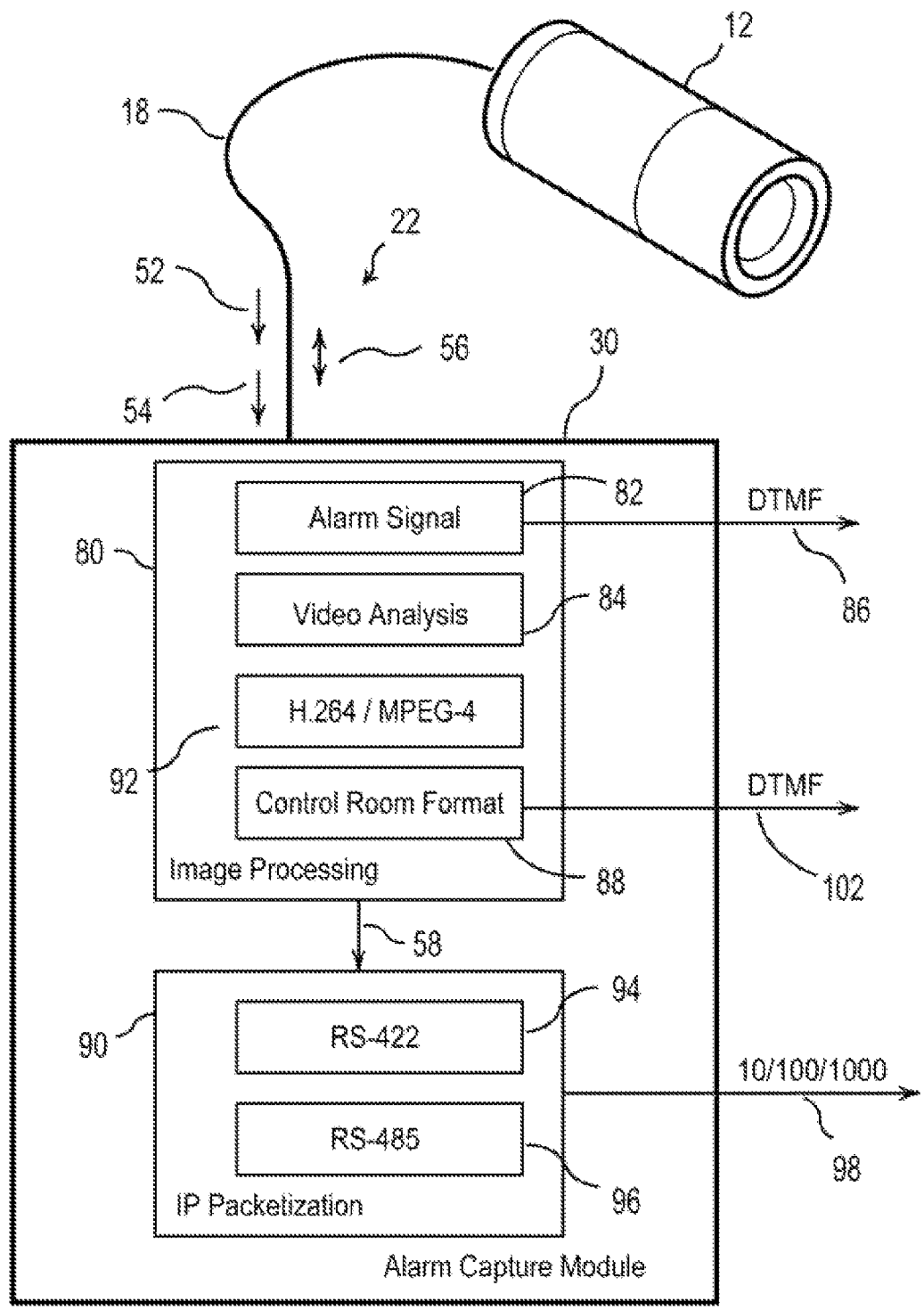
FIG. 2 is a functional block diagram showing components of the alarm capture module of FIG. 1.

As shown in FIG. 2, the camera data stream 22 generated by the IR camera 12 may include: (i) an 8-bit or a 16-bit digital video signal 52, and (ii) an analog video signal 54. A serial communication path 56 may be used to provide transfer locally-generated or remotely-generated control signals to the IR camera 12. The video signals 52, 54 may be provided to an image processing module 80 in the alarm capture module 30 for analysis and alarm generation as described in greater detail below.

Figure 3:
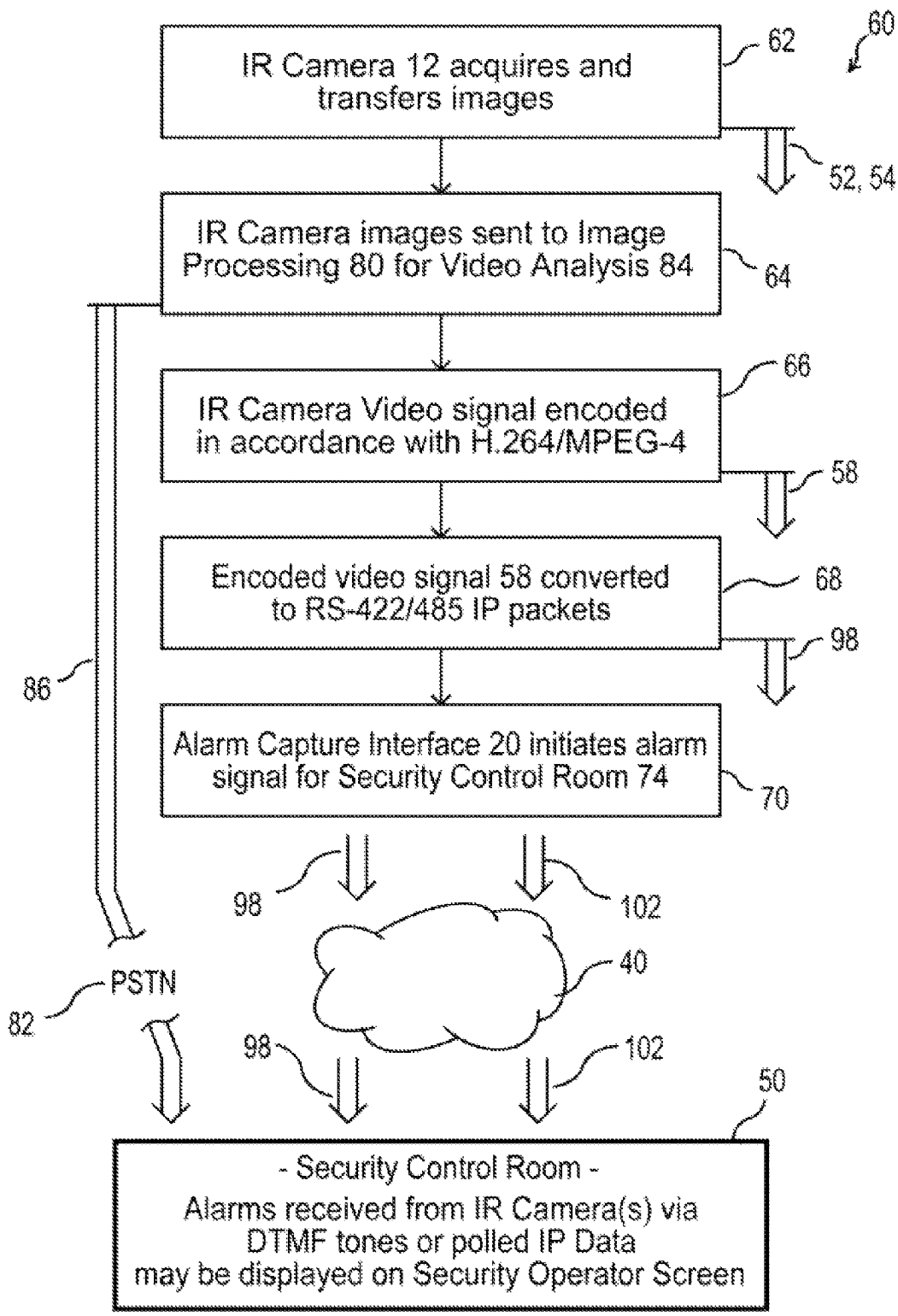
FIG. 3 is a flow diagram illustrating operation of the intruder alarm system of FIG. 1.

As shown in a functional flow chart 60 in FIG. 3, digital images are acquired by and transmitted from the IR camera 12 as the video signals 52, 54, at step 62. The video signals 52, 54 may be analyzed for predefined characteristics in the image processing module 80 using a video analysis software application 84, at step 64. If suspicious or questionable activity is detected by the video analysis software application 84, the alarm capture module 30 may immediately generate either, or both, a transmitted alarm signal 86 and a control room alarm signal 102, and transmit the alarm signal(s) to the remote security control room 50, as described below. The transmission may be accomplished via a transmission network 40 that may include wired, cellular, and VPN capabilities. Alternatively, the transmitted alarm signal 86 may also be sent to one or more individual users of the intruder alarm system 10, such as an owner of a facility, or a security guard patrolling on the premises of the secured area.

The IR camera 12 operates by sensing the thermal emission of an object, or person such as an intruder entering the field of view of the IR camera 12. The video analysis software application 84 analyzes the relevant video frames for a particular IR signature. By using the IR camera 12 for detection, rather than using a passive IR sensing device, such as may be found in a conventional alarm system, the user can set up the IR camera 12 for optimal viewing, and define a 'no-go' region in the viewing area with the video analysis software application 84. Detected movement in the 'no-go' region initiates the alarm(s).

By using the IR camera 12 in combination with the analysis software application 84, the intruder alarm system 10 can realize a lower probability of sending false alarm signals to a monitoring facility than would a system incorporating a passive infrared sensing device. Also by using the IR camera 12 for detection, rather than using a passive IR signature, the control room operator or the end user is able to visually verify the alarm, by reviewing the video frames provided by the IR camera 12.

In an exemplary embodiment, the video analysis software application 84 analyzes the video frames for high-contrast infrared images or a newly-appearing pattern resulting from the appearance and detection of a warmer, moving object in a relatively cooler surrounding environment. The IR camera 12 may be designed for sensitivity to short wave, to mid-wave, or to long-wave thermal radiation, such as seven to fourteen microns, so as to produce an optimal contrast in the video frames. Intruder activity may be established as the sudden occurrence of a newly-appearing pattern or a contrasting image in one or more sequential video frames.

That is, intruder activity may be inferred or deduced by the analysis software application 84 if the high-contrast image or the new pattern appears in the monitored area for a predetermined number of sequential video frames, for example, for a minimum of two to one hundred video frames. As the infrared energy emitted by an object or body-appears, or otherwise enters the field of view of the IR camera 12, the video frames recorded by the IR camera 12 may begin to display one or more of the high-contrast infrared images, new pattern, or new object detectable by the video analysis software application 84. Alternatively, the recording speed of the IR camera 12 may be set to a relatively slow speed, of a few frames per minute, and the analysis software application 84 may be modified to indicate intruder activity if the high-contrast image or the new pattern appears in a single video frame, or in a few sequential video frames.

If a suspicious event or intruder activity is thus indicated or detected by the video analysis software application 84, the indication or detection information may be utilized by the alarm capture module 30 to generate one or more alarm signals. In response to the notification of the suspicious event or the intruder activity, the alarm capture module 30 may generate a corresponding pre-specified alarm signal 86 comprising DTMF tones, and may transmit the alarm signal 86 directly to the remote monitoring facility via the PSTN as shown in FIG. 3.

Alternatively, the alarm signal 86 transmitted to the remote monitoring facility may be formatted as a control room alarm signal 102, by means of a control room formatting module 88, and sent directly to the security control room 50 as shown. The control room formatting module 88 may function in accordance with any conventional receiving format such as, for example, 3+1, 4+1 Standard and Extended, Acron Touchtone, ADEMCO Contact ID, ADEMCO Express, ADEMCO High Speed, BFSK, FBII 4+3+1, ITI CareTaker+, SecurityPro 4000, ITI Commander, ITI Commander 2000, LifeGard, ITI RF Commander, Harbor Gard, ITI SX-V, ITI UltraGard, Modem II, Modem IIe, SK 4+2, SK FSK, Radionics 3+1 Checksum, Sescoa 3+1/Franklin 3+1, SIA DCS, SK 3+1/3+1 Extended, SX-III, SX-IVA, SX-IVB, Varitech FSK 4/1, 4/2 Westec.

A video compression module 92 in the image processing module 80 may function to compress either or both of the video signals 52, 54 into a compressed video signal stream 58, at step 66. In an exemplary embodiment, the video compression module 92 operates in conformance with video standard H.264/MPEG-4, for example, or motion MPEG, or other type of video encoding. The resulting compressed video signal stream 58 may be provided to an IP packetization module 90 for formatting into an IP packet configuration, at step 68.

The IP packetization module 90 may function using a first protocol translation module 94, operating in accordance with telecommunications specification ANSI Standard RS-422, or alternatively, by using a second protocol translation module 96, operating in accordance with telecommunications specification ANSI Standard RS-485. Transmission of the resultant video IP signal stream 98 may be made over a 10/100/1000 Ethernet network.

At step 70, the alarm capture interface 20 initiates transmission of one or more of the alarm signal 86, the video transmission signal 98, and the control room alarm signal 102. The transmitted alarm and video signals are provided to the transmission network 40, which may comprise the PSTN, a wired network, a wireless cellular network, or a virtual private network (VPN), for example. One or more of the alarm signal 86, the video transmission signal 98, and the control room alarm signal 102 are received at the remote security control room 50, and corresponding data and video information may be displayed onto the screen of a security operator. It can be appreciated by one skilled in the art that the transmitted alarm signal 86 or the control room alarm signal 102 is received at the remote security control room 50 at essentially at the same time as the corresponding video transmission signal 98.

In an exemplary embodiment, the alarm capture interface 20 may output the alarm signal 86 and the control room alarm signal 102 via the telephone connection socket 44, shown in FIG. 1. In addition, the alarm capture interface 20 may output the video transmission signal 98 via the IP data connection socket 46. In an alternative embodiment, the wireless signal 28 may include the video transmission signal 98.

It is to be understood that the description herein is exemplary of the invention only and is intended to provide an overview for the understanding of the nature and character of the invention as it is defined by the claims. The accompanying drawings are included to provide a further understanding of various features and embodiments of the method and apparatus of the invention which, together with their description serve to explain the principles and operation of the invention.

Thus, as stated above, while the invention has been described with reference to particular embodiments, it will be understood that the present invention is by no means limited to the particular constructions and methods herein disclosed and/or shown in the drawings, but also comprises any modifications or equivalents within the scope of the claims. Further, the purpose of the Abstract is to enable the U.S. Patent and Trademark Office, the public generally, and in particular practitioners in the art who are not familiar with patent or legal terms or phraseology, to determine from a cursory inspection the nature and essence of the technical disclosure of the application. Accordingly, the Abstract is not intended to define nor limit the claims in any way.

What is claimed is:

1. An intruder alarm system comprising:
an infrared camera monitoring a predetermined area of interest and providing a video transmission signal including a plurality of video frames to a remote monitoring facility;
a video analysis module in communication with said infrared camera, said video analysis module for providing video analysis of at least one of a plurality of said video frames provided by said infrared camera; and
an alarm signal module for generating an alarm signal in response to intruder activity indicated in a predefined "no go" zone by said video analysis module, said alarm signal received at said remote monitoring facility at the same time as a corresponding video transmission signal.

2. The intruder alarm system according to claim 1 wherein said infrared camera is responsive to thermal emissions indicative of human body temperature.

3. The alarm system according to claim 1 wherein said infrared camera is responsive to remotely generated control signals.

4. The alarm system according to claim 3 wherein said alarm signal module functions to generate said alarm signal in response to detection by said video analysis module of at least one contrasting image or a newly-appearing pattern in said at least one of said plurality of video frames.

5. The alarm system according to claim 1 wherein said alarm signal is transmitted to said remote monitoring facility over at least one of a wired network, a wireless cellular network, a public switched telephone network, and a virtual private network.

6. The alarm system according to claim 5 wherein said alarm signal comprises dual-tone multi-frequency tones.

7. The alarm system according to claim 1 further comprising a control room format module for formatting said alarm signal.

8. The alarm system according to claim 7 wherein said control room format module functions in accordance with at least one of 3+1, 4+1 Standard and Extended, Acron Touchtone, ADEMCO Contact ID, ADEMCO Express, ADEMCO High Speed, BFSK, FBII 4+3+1, ITI CareTaker+, SecurityPro 4000, ITI Commander, ITI Commander 2000, LifeGard, ITI RF Commander, Harbor Gard, ITI SX-V, ITI UltraGard, Modem II, Modem IIe, SK 4+2, SK FSK, Radionics 3+1 Checksum, Sescoa 3+1/Franklin 3+1, SIA DCS, SK 3+1/3+1 Extended, SX-III, SX-IVA, SX-IVB, Varitech FSK 4/1, 4/2 Westec.

9. The alarm system according to claim 1 further comprising a video compression module for compressing said plurality of video frames into a compressed video signal stream.

10. The alarm system according to claim 9 further comprising an IP packetization module for converting said compressed video signal stream into a video IP signal stream.

11. The alarm system according to claim 10 wherein said video IP signal stream is transmitted to a remote monitoring facility over a 10/100/1000 Ethernet network.

12. The alarm system according to claim 10 wherein said IP packetization module operates in accordance with any of ANSI Standards RS-422, RS-485, or RS-232.

13. A method for infrared monitoring of a predetermined area of interest, said method comprising the steps of:
setting up an infrared camera having a field of view including the predetermined area of interest;
transmitting a video transmission signal including a plurality of video frames from said infrared camera to a video analysis module and to a remote monitoring facility;
analyzing video images in said plurality of video frames with said video analysis module;
if said video analysis module provides an indication of the presence of an intruder in a predefined "no go" zone, generating an alarm signal in response to said indication, said alarm signal received at said remote monitoring facility at the same time as a corresponding said video transmission signal.

14. The method according to claim 13 wherein said step of setting up comprises the step of remotely controlling said infrared camera via a communication network.

15. The method according to claim 13 wherein said step of analyzing said video images comprises the step of detecting the appearance of at least one contrasting image in said plurality of video frames.

16. The method according to claim 13 further comprising the step of transmitting said alarm signal to said remote monitoring facility.

17. The method according to claim 13 wherein said alarm signal comprises dual-tone multi-frequency tones.

18. The method according to claim 13 wherein said alarm signal comprises a signal formatted in accordance with at least one of: 3+1, 4+1 Standard and Extended, Acron Touchtone, ADEMCO Contact ID, ADEMCO Express, ADEMCO High Speed, BFSK, FBII 4+3+1, ITI CareTaker+, SecurityPro 4000, ITI Commander, ITI Commander 2000, LifeGard, ITI RF Commander, Harbor Gard, ITI SX-V, ITI UltraGard, Modem II, Modem IIe, SK 4+2, SK FSK, Radionics 3+1 Checksum, Sescoa 3+1/Franklin 3+1, SIA DCS, SK 3+1/3+1 Extended, SX-III, SX-IVA, SX-IVB, Varitech FSK 4/1, 4/2 Westec.

19. The method according to claim 13 further comprising the step of sending said plurality of video frames to a remote monitoring facility.

20. The method according to claim 19 further comprising the step of formatting said video frames in accordance with any of ANSI Standards RS-422, RS-485, or RS-232 for transmission over a 10/100/1000 Ethernet network.

\* \* \* \* \*